United States Patent Office 2,923,693
Patented Feb. 2, 1960

2,923,693

ADHESIVE COMPRISING DRIED SULPHITE WASTE MATERIAL, POLYACRYLAMIDE, FILLER AND ALKALINE MATERIAL

Warren A. Lemke, Glens Falls, N.Y., asisgnor to International Paper Company, New York, N.Y., a corporation of New York No Drawing. Application August 2, 1954
Serial No. 447,429

1 Claim. (Cl. 260—17.5)

This invention relates to new and useful improvements in adhesives in general and particularly seeks to provide a novel adhesive prepared from dried sulphite waste liquor and an organic material compatible with the dried sulphite waste liquor.

Concentrated sulphite waste liquor has been used many times in the past for such things as a binder in briquetting operations or in the formation of foundry cores, as a road binder, as an ingredient in linoleum paste, and other generally analogous uses. When concentrated sulphite waste liquor is used alone as an adhesive it is not satisfactory for use in normal gluing operations such as the laminating of paperboards or the winding and gluing of paper cores. Its deficiencies for these types of uses stem from the fact that it is a hydroscopic material, it is extremely slow setting, and when it dries it becomes brittle. Concentrated sulphite waste liquor having a solids content high enough for attempted use as a glue also has poor cohesive strength when in a liquid state of proper viscosity for proper flowing or distribution in gluing operations. It is also subject to the very severe limitation that it has a poor initial tack.

In more recent years efforts have been made to combine either concentrated or dried sulphite waste liquor with other materials such as polyvinyl alcohol; and the resultant adhesive, while considerably better than sulphite waste liquor used alone, still is not entirely satisfactory. Mixing is difficult, and it is necessary to use still more additive chemicals such as borax to obtain minimum acceptable initial tack. The adhesives produced in accordance with earlier practices are very difficult to spread when having a solids content of 50% or more. These types of adhesives are also quite expensive due to the cost of polyvinyl alcohol or equivalent compound.

An adhesive manufactured in accordance with this invention not only eliminates the problems heretofore encountered through the use of dried or concentrated sulphite waste liquor alone or with polyvinyl alcohol or other materials as mentioned above, but provides an adhesive which is more economical to produce.

Therefore, an object of this invention is to provide an adhesive whose solids content, insofar as the active adhesive ingredients are concerned, consists essentially of a relatively high proportion of sulphite waste material and a relatively low proportion of an organic compound known as polyacrylamide.

A further object of this invention is to provide an adhesive of the character stated in which initial tack, as indicated by fiber pull on fact-to-face laminations, is progressively increased as the amount of sugar in the sulphite waste solids is decreased.

A further object of this invention is to provide an adhesive of the character stated which is quick setting, has good cohesive strength in its liquid state, has excellent initial tack, sets quickly, does not become brittle when dried, is not hygroscopic and spreads readily in gluing operations.

For the purpose of this invention the term "sulphite waste material" is intended to include the residual sulphite wastes which remain after sulphite waste liquor as it is obtained from a pulp mill digester has been run through processing operations as in yeast or alcohol plants or in lignin recovery plants, or sulphite waste liquor that has been subjected to a desugaring operation. It is apparent that whatever are the compounds in sulphite waste liquor that render it usable in the manufacture of adhesives, they are not deleteriously affected for adhesive purposes by processing operations of the types mentioned above.

I have discovered that adhesives having greatly improved viscosity and initial tack characteristics, by comparison with those heretofore made using sulphite waste liquor or sulphite waste material, can be prepared from sulphite waste materials of low sugar content and a high viscosity polyacrylamide with or without the addition of a small amount of an oxide or hydroxide of the alkalis or alkaline earth metals.

Sulphite waste liquor as obtained from a pulp mill normally contains in the neighborhood of 20% sugar in the solids. When sulphite waste liquor is subjected to various converting or recovery processes such as in yeast or alcohol plants or in lignin recovery plants, the sulphite waste materials remaining from such operations contain varying amounts of sugar ranging downwardly from the approximate 20% in sulphite waste liquor to about 0% in the normally disposable sulphite waste material obtained from a lignin recovery plant.

One manner of preparing an adhesive in accordance with this invention is to create a dry mix which can be dissolved or dispersed in warm water to whatever solids content is desired.

A typical formula would comprise:

| | Percent |
|---|---|
| Clay | 35 |
| Dried sulphite waste material containing 20% or less sugar | 62 |
| Polyacrylamide | 3 |
| | 100 |

In this formulation the clay serves as an inert filler and in addition is apparently effective to shorten the drying time and to minimize stringiness of the adhesive when being worked into a solution and applied during gluing operation. The polyacrylamide employed in this formula is one supplied by the American Cyanamid Company and is identifiable at the present time only as a high viscosity polyacrylamide having the general formula $(CH_2CHCONH_2)_x$.

When it is desired to prepare an adhesive solution from the dry mix it is only necesary to supply and intermix warm water (i.e. about 120°–125° F.) in an amount sufficient to reduce the solids content to the desired range for proper flow and adhesive characteristics, namely, to about 40%–50% solids for most gluing operations. It will, of course, be understood that for certain specific applications the solids content of the adhesive solution may be varied either above or below the indicated 40%–50% range.

The 35–62–3% formulation given above is intended to be indicative only of one formulation which has been found to be usable and is presented herewith for illustrative purposes only.

Considering the dried sulphite waste material and the polyacrylamide as the active adhesive ingredients, formulations have been prepared successfully and tested in which the dried sulphite waste material was present in amounts ranging from 98% to 85% and the polyacrylamide was present in amounts ranging from 2% to 15%.

As indicated above, reduction of the sugar content of the sulphite waste solids results in increased initial tack and higher viscosity. This will be readily apparent by reference to the data presented below in which a series of 50% solids adhesives were prepared based on the above mentioned 35-62-3% formulation, but with sulphite wastes successively containing decreasing amounts of sugar.

(1) (20% sugars in S.W.L.) 35% fiber pull
(2) (15¾% sugars in S.W.L.) 45% fiber pull
(3) (11½% sugars in S.W.L.) 60% fiber pull
(4) (7¼% sugars in S.W.L.) 65% fiber pull
(5) (3% sugars in S.W.L.) 80% fiber pull
(6) (0% sugars in S.W.L. 90% fiber pull The foregoing values for fiber pull were determined from face-to-face laminations made by drawing down an adhesive film 7 inches by 16 inches with a suitable applicator on wrapper board made at the Hudson River Mill of the International Paper Company. As soon as the film was made another piece of wrapper was immediately placed on top, and the lamination was placed under plate glass for thirty seconds at a pressure of 4¾ pounds per square foot. Then the two sheets were pulled apart and the condition of the glued section observed.

It is apparent that the higher the sugar content of the sulphite waste solids the lower is the initial tack as indicated by the reduced percentages of fiber pull. This is particularly evident where the sugar content is from 3% to 20% of the sulphite waste solids. At or below 3% sugar the fiber pull is excellent.

I have discovered that the deleterious effects of sugar in the sulphite waste solids can be substantially reduced or eliminated if there is added to the adhesive mix from about ½% to about 3%, based on total solids, of an alkaline material such as sodium hydroxide, ammonium hydroxide, calcium oxide or hydroxide, magnesium oxide, or potassium hydroxide.

This is clearly shown in the data below giving the results in terms of percent fiber pull on laminates prepared from another series of 50% solids adhesives based on the same 35-62-3% formulation with decreasing amounts of sugar in the sulphite waste, but to which was added ½% magnesium oxide based on total solids of the other ingredients.

(1) (20% sugars in S.W.L. plus ½% MgO) 45% fiber pull
(2) (15¾% sugars in S.W.L. plus ½% MgO) 60% fiber pull
(3) (11½% sugars in S.W.L. plus ½% MgO) 70% fiber pull
(4) (7¼% sugars in S.W.L. plus ½% MgO) 75% fiber pull
(5) (3% sugars in S.W.L. plus ½% MgO) 90% fiber pull
(6) (0% sugars in S.W.L. plus ½% MgO) 98% fiber pull It will be observed from the foregoing data that the addition of a small quantity of an alkaline material not only increases fiber pull when sugar is present in the sulphite waste material, but also when the sulphite waste is sugar-free.

Adhesives prepared in accordance with this invention and containing at least 8% polyacrylamide (calculated as an active ingredient), while usable for ordinary face to face laminations as in the manufacture of paper cores, are also usable to form remoistenable types of adhesive films as in the manufacture of gummed tapes or labels.

Many tests have been made with the 35-62-3% and other formulae within the ranges indicated above, and they all indicate that in face to face lamination of sheets of paper or paperboard and in the winding and gluing of paper cores the initial tack as indicated by fiber pull is excellent. The adhesive spreads well and covers fully. It sets quickly and dries rapidly and does not become brittle upon completion of drying.

I claim:

An adhesive whose ingredients comprise 62% to 98% of dried sulphite waste material containing less than 20% sugar, from 2% to 15% of polyacrylamide, an inert filler and from 0.5% to 3%, based on the total weight of the other ingredients, of an alkaline material selected from the group consisting of ammonium hydroxide and the oxides and hydroxides of the alkali and alkaline earth metals.

References Cited in the file of this patent

UNITED STATES PATENTS

| | | |
|---|---|---|
| 1,976,679 | Fikenstcher et al. | Oct. 9, 1934 |
| 1,984,417 | Mark et al. | Dec. 18, 1934 |
| 2,443,889 | Bruce et al. | June 22, 1948 |
| 2,455,961 | Walker | Dec. 14, 1948 |

FOREIGN PATENTS

| | | |
|---|---|---|
| 224,655 | Switzerland | Mar. 16, 1943 |